May 28, 1963 A. E. KUNEN 3,091,079
PROPULSION ENGINE WITH ELECTROMAGNETIC MEANS
TO PRODUCE PROPELLANT ACCELERATION
Filed March 17, 1959 3 Sheets-Sheet 1
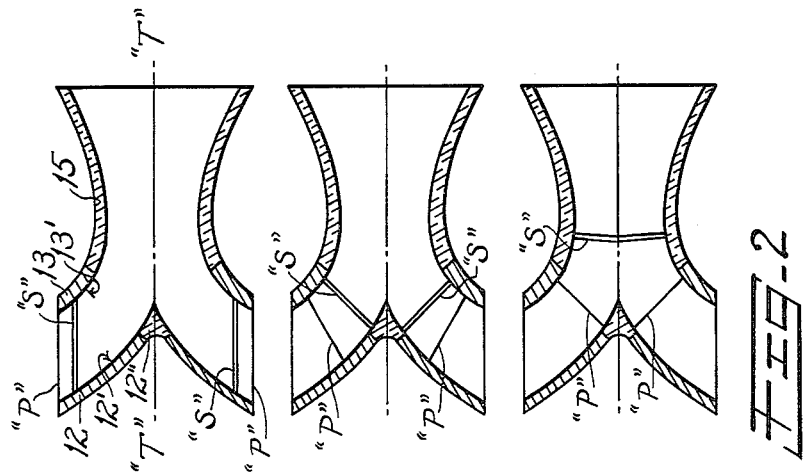
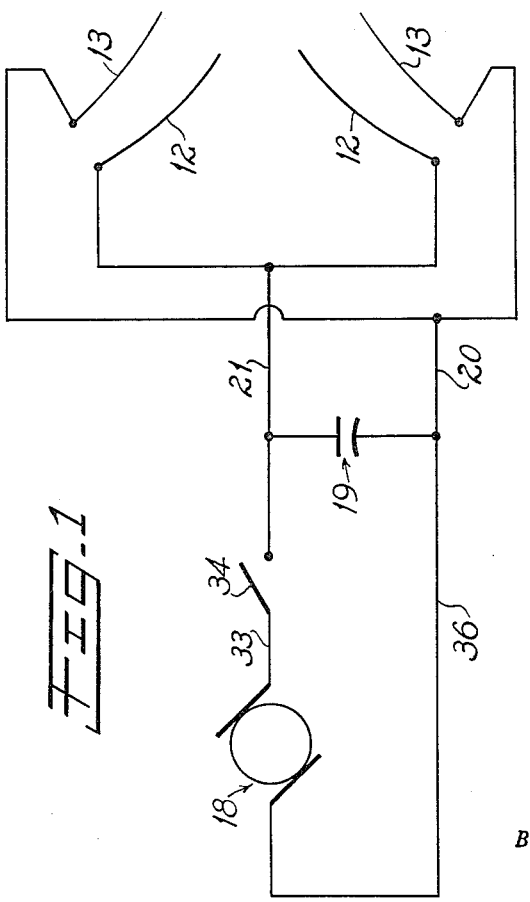
INVENTOR.
ALFRED E. KUNEN
BY John J. Sullivan
ATTORNEY

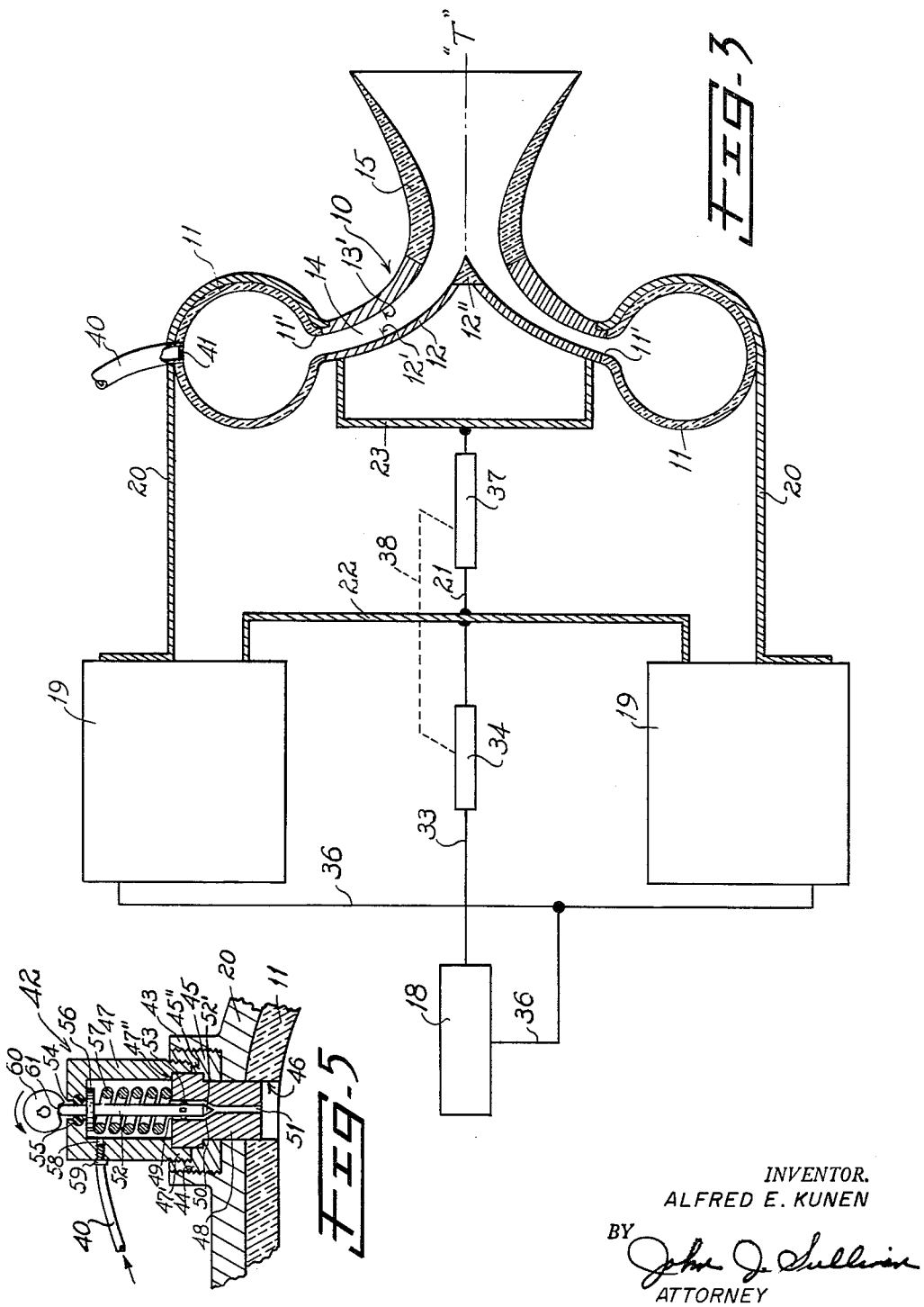

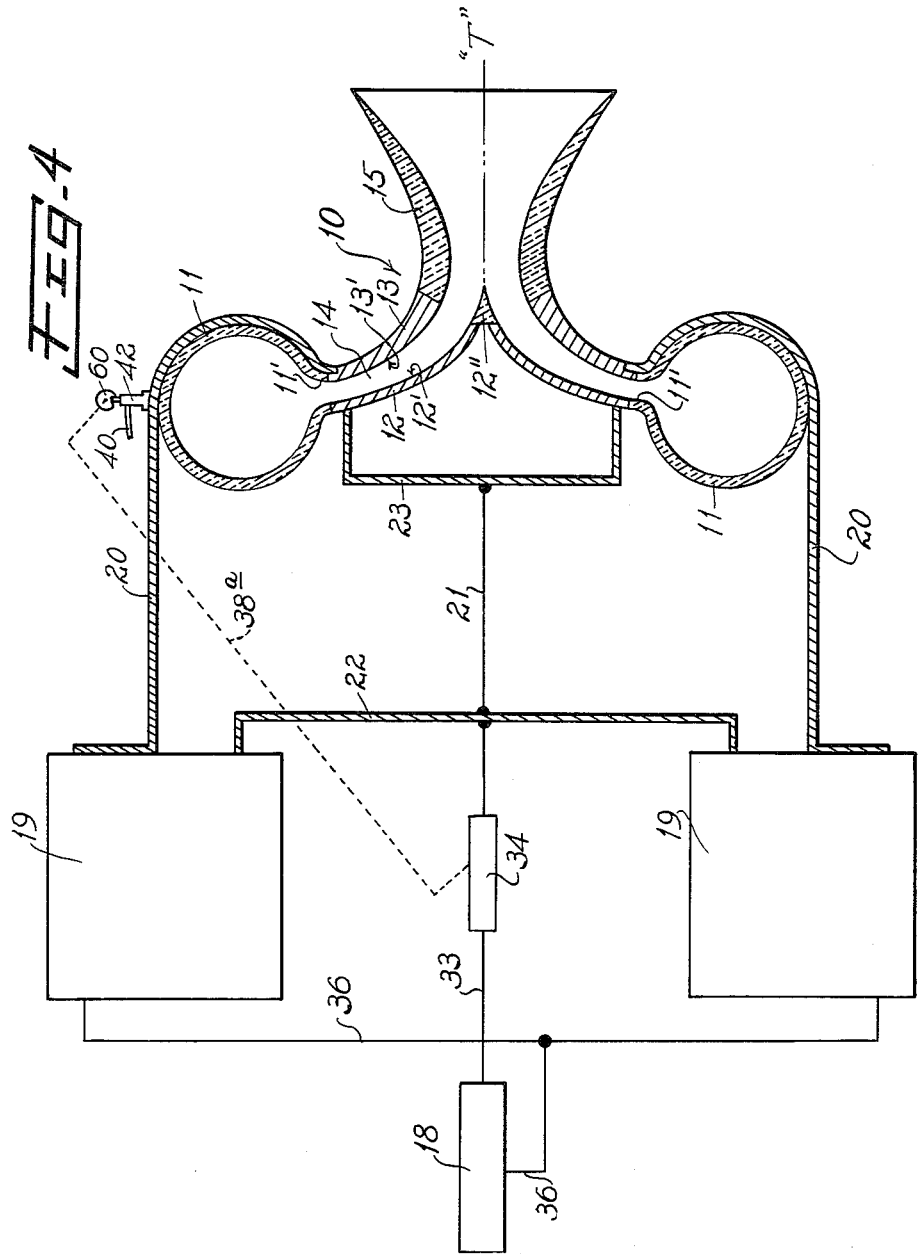

United States Patent Office 3,091,079
Patented May 28, 1963

3,091,079
PROPULSION ENGINE WITH ELECTROMAGNETIC MEANS TO PRODUCE PROPELLANT ACCELERATION
Alfred E. Kunen, Massapequa Park, N.Y., assignor to Republic Aviation Corporation, Farmingdale, N.Y., a corporation of Delaware
Filed Mar. 17, 1959, Ser. No. 800,024
15 Claims. (Cl. 60—35.5)

This invention relates generally to engines and more particularly to a propulsion engine wherein electromagnetic forces act on and against a propellant to accelerate it along a controlled path and thereby develop thrust. The word "propellant" is used herein in the broad or generic sense of fuel which may be a fluid or a solid, combustible or non-combustible.

The present invention, among other things, proposes an engine including means for the delivery of a propellant thereto and means periodically operative to establish electromagnetic forces in the engine by which the propellant is activated and set in motion therein and accelerated therethrough along a controlled path whereby the reaction thereof produces thrust.

To the above ends, the instant engine includes a pair of spaced, generally circular electrodes so designed and constructed that they cooperate one with the other to define a path for the propellant having radially inwardly sloping walls. These walls are concentrically located with reference to the centerline of thrust of the engine and one of the walls terminates in a central apex. The other wall terminates in a central opening and constitutes an exhaust exit from the path along the line of thrust.

The electrodes are operatively connected in an electrical circuit and means is provided to periodically open and close the circuit whereby electrical discharges are repeatedly produced across the electrodes. With each such discharge a current passes between the outermost or peripheral edges of the electrodes to form a cylindrical shell of current, a phenomenon known as "skin effect" of transient currents.

At the same time, any propellant between the electrodes becomes ionized in whole or in part. The magnetic field established around the cylindrical shell of current reacts with the axial current forming the shell to constrict or reduce the diameter of the shell between the electrodes. This phenomenon has been called "electromagnetic pinch." The speed of such constriction is such that the propellant is accelerated and driven thereby radially and inwardly of the electrodes along the path defined by the electrodes. This action of the shell on and against the propellant may be said to constitute an electromagnetic piston.

In the wake of each successive electromagnetic piston is a relatively low pressure space. Additional propellant is delivered to and sucked into this space where it also is acted upon and against by the ensuing piston as before whereby continuous operation of the engine results.

With the above and other objects in view, as will be apparent, this invention consists in the construction, combination and arrangement of parts, all as hereinafter more fully described, claimed and illustrated in the accompanying drawings, wherein:

FIG. 1 is a wiring diagram to show the general circuitry by which an electrical discharge is effected across the spaced electrodes;

FIG. 2 is a series of functional schematics of the engine in section to show in three stages movement of the electromagnetic piston and shock wave created thereby through the controlled path established by the electrodes by which thrust is developed;

FIG. 3 is a longitudinal section of the engine together with an electrical wiring diagram (partly in block form) to show the operative interconnection of the components thereof, including one form of control means for the periodic electrical discharge across the electrodes;

FIG. 4 is a similar view to show another type of control means for the periodic electrical discharge across the electrodes; and FIG. 5 is a section through the control element shown generally in FIG. 4.

With reference more particularly to the drawings, 10 designates an engine constructed in accordance with the teachings of this invention. This engine 10 includes an annular chamber 11 to receive the propellant under pressure from a suitable source or tank (not shown) through one or more pipes or conduits 40. The chamber 11 is concentrically mounted about the line of thrust "T" located at and along the longitudinal centerline of the engine. The wall of chamber 11 adjacent the line "T" is open and extends radially inwardly of the engine as at 11' to define conduit means for the passage of the propellant from the chamber 11.

A pair of generally circular electrodes 12 and 13 is connected by any means known to the art one in edge to edge abutment to each inner edge of the extended chamber wall or conduit means 11' to be disposed in spaced relation one to the other and surrounded by the annular chamber 11. The chamber 11 is electrically insulated from the electrodes 12 and 13 and this is preferably accomplished by fabricating the chamber of dielectric material, such as a ceramic.

Each of the electrodes 12 and 13 is arcuately shaped from its peripheral edge radially inwardly whereby the respective adjacent surfaces 12' and 13' thereof define an annular passage 14 extending from the chamber 11 in an aft direction relative to the engine 10. The surfaces 12' and 13' are preferably divergent aftwardly to such a degree that a uniform cross-sectional area is established throughout the length of the passage 14. At its center the forward electrode 12 terminates in an apex 12" of dielectric, heat resistant material such as, for example, a ceramic. The rear electrode 13 terminates centrally in an aperture the edge of which is adapted to abut the complementary end of an extension 15 of dielectric, heat resistant material like ceramic. When the extension 15 is thus located, it is fixedly secured to the electrode 13 in any suitable manner known to the art whereby the opposed surfaces thereof form a smooth continuation of the corresponding surfaces of the electrode 13.

Thus, when an electrical discharge is produced across the electrodes 12 and 13, as will be described hereinafter, a cylindrical shell of current or electromagnetic piston "P" (FIG. 2) is created at the outer periphery of the electrodes. This shell or piston "P" moves inwardly of the engine 10 at substantial right angles to the electrodes 12 and 13 at such a speed that a shock wave "S" is created in advance of the piston. This shock wave "S" moves from an initial position parallel to the line of thrust "T" to a position substantially normal thereto due to the relative length and concentric disposition of the electrodes relative to line "T." The propellant or parts thereof between the electrodes 12 and 13 are initially ionized and then pushed or accelerated by the current or piston "P" along the passage 14 and out through the extension 15. The reaction forces thus created by the accelerated propellant or plasma act on and against the surface 12' of the electrode 12 to produce thrust whereby forward propulsion is obtained. This thrust is supplemented by the action of the plasma on and against the internal surface 15' of the extension 15 which for this purpose is made to flare outwardly.

In order to produce an electrical discharge across the electrodes 12 and 13, the invention contemplates two arrangements, viz., that illustrated in FIG. 3 and that illustrated in FIG. 4. Broadly, and referring momentarily to FIG. 1, in each arrangement a generator 18 is connected to the opposed plates or terminals of a capacitor 19 through the conductors 33 and 36. One terminal of the capacitor in turn is connected to the electrode 12 through a conductor 21 and the other terminal of the capacitor is connected to the electrode 13 through a conductor 20. Operation of the generator by any means known in the art serves to charge one of the plates or terminals of the capacitor 19. In order to control this charging operation a switch 34 is interposed in the conductor or line 33 to make and break the circuit. When the capacitor is thus charged (switch 34 is closed) it is periodically made to discharge across the electrodes 12 and 13 (switch 34 is opened) for the operation of the engine.

FIGS. 3 and 4 show different means to control the discharge of the capacitor 19 in FIG. 1. In each case the control means is synchronized for operation in unison with and opposition to the switch 34 to the end that such control means is operative for the discharge of the capacitor 19 only when the switch 34 is open.

In each of FIGS. 3 and 4 coaxial circuitry is shown between the capacitor means and the electrodes to more clearly illustrate the structural arrangement of the components of the engine symmetrically disposed about the line of thrust "T." Thus, multiple capacitors 19 are connected in parallel through a collecting ring, disc or cylinder 22 to the line 33. A similar collecting ring, disc or cylinder 23 may be employed to connect the line 21 to the electrode 12. The conductor 20 comprises a casing connected at one of its ends to the capacitors 19 and at its other end enclosing the mixing chamber 11 and connected to the electrode 13. In such an arrangement the casing 20 is, of course, appropriately insulated from the chamber 11.

According to that form of the invention shown in FIG. 3, a switch 37 is operatively connected in the line 21 between the capacitor or capacitors 19 and the electrode 12. This switch 37 is connected to the switch 34 through means 38 for simultaneous and opposite operation whereby one or the other of the switches 34 or 37 is open when the other is closed. Thus, when the switch 34 is closed and switch 37 is open the generator 18 charges the capacitors 19. At a predetermined time reverse switching occurs (switch 37 is closed and switch 34 opens) and the capacitors 19 discharge across the electrodes 12 and 13. Thus, the capacitors are repeatedly and periodically charged and discharged for the continuous operation of the engine 10.

With each successive periodic discharge of the capacitors 19 across the electrodes 12 and 13 as above described, the propellant or a portion thereof in the passage 14 is initially ionized and the cylindrical shell of current or electromagnetic piston "P" is created between the electrodes 12 and 13 at the periphery thereof. Radially inward movement of the piston, i.e., pinch, creates the shock wave "S" and the ionized propellant or plasma is accelerated ahead of the piston "P" along the passage 14 and out through the extension 15. The forces thereby created by movement of the plasma act against the surface 12' and the inner surface of the extension 15 to cause the thrust.

With each such discharge of current across the electrodes 12 and 13 the successive electromagnetic pistons "P" are followed by a low pressure space. Additional propellant is thereby drawn or sucked from the chamber 11 into the passage 14. The timing of the switches 34 and 37 through means 38 is such that during this interval switch 34 is closed and switch 37 is open whereby the capacitors 19 are being recharged by the generator 18. When the capacitors have been recharged, reverse switching occurs whereby switch 34 opens and switch 37 closes. The resulting discharge of current across the electrodes 12 and 13 ionizes and acelerates the newly admitted propellant in the passage 14 in the same manner as before. This operation continues whereby successive electromagnetic pistons operate through the annular passage 14 and the ionized propellant or plasma is discharged rearwardly from the extension 15 ahead of each piston whereby forward propulsion is accomplished.

In this form of the invention, the flow of propellant from the pressurized source or tank is continuous. However, such flow is relatively slow, being designed to coincide with the charging and recharging operation of the capacitors 19 by the generator 18 as described. The rate of flow is such that the next discharge of current across the electrodes occurs prior to the escape of propellant through the aft end of the extension 15. To this end a metering device, for example, a perforated disc 41, is provided in the conduit 40 adjacent the chamber 11. Where the propellant employed is a liquid, this device or disc 41 may also serve as a restrictor to create a pressure drop and thereby convert the liquid to a gaseous state for delivery into the chamber 11.

Unlike the arrangement of FIG. 3, the form of the invention shown in FIG. 4 is limited to operation in space or at relatively high altitudes where the atmosphere is rarefield. Here, in lieu of the switch 37 a valve 42 is provided in the line 40. While any one of many known valves may be employed for this purpose so far as the present invention per se is concerned, FIG. 5 shows in detail such a valve for a clearer understanding of the invention.

To this end, a boss 43 is formed or produced on the external wall of the chamber 11. The boss 43 is pierced by a hole 44 which is threaded to receive a threaded cylindrical fitting 45 substantially equal in length to the thickness of the boss 43. The wall of the chamber 11 is similarly pierced by a hole 46 equal in size to and in alignment with the adjacent end of the central hole in the fitting 45 when the fitting 45 is mounted therein.

The internal diameter of the fitting 45 is enlarged in steps outwardly thereof to create two internal shoulders 45' and 45''. At its outer end the fitting 45 is threaded internally to receive the threaded projecting end 47' of a cup 47, the end 47' being adapted to abut the shoulder 45'' when the cup 47 is connected to the fitting 45. The internal diameter of the cup 47 adjacent its end 47' is enlarged to create a shoulder 47'', such diameter being substantially equal to, for alignment with, the internal diameter of the fitting 45 between the shoulders 45' and 45''.

A nozzle 48 having an external diameter corresponding to the internal diameters thus established by the fitting 45, cup 47 and hole 46 is adapted to be immovably secured within the fitting 45 and end 47' of the cup 47 in abutment against the respective shoulders 45' and 47''.

Internally the nozzle 48 is bored or otherwise provided with a central passage 49 which is considerably smaller in diameter than the internal diameter of the cup 47. Medially of its length the passage 49 tapers, as at 50, to terminate in an exit orifice 51 communicating with the interior of the chamber 11.

Concentrically mounted within the passage 49 is a reciprocable stem or needle 52 which terminates in a conical head 52' the surface of which is parallel to the taper 50 of the passage. Adjacent the head 52' the needle 52 is provided with a number of localized lateral projections 53 each of equal length for abutting engagement against the surface of the nozzle 48 defining the passage 49. The projections thereby serve to maintain the needle 52 concentrically disposed in the passage and act as bearing surfaces to facilitate its reciprocation.

At its other end the needle 52 extends beyond the associated end of the nozzle 48 passing into and through an aperture 54 in the center of the base or outer end of the cup 47. The diameter of the needle 52 at this end is substantially equal to that of the aperture 54 whereby the needle is held against relative lateral movement. A suitable seal 55 defines the aperture 54 to prevent a leak therethrough around the needle 52.

A fixed peripheral collar 56 is carried by the needle 52 adjacent its outer end and within the cup 47. This collar 56 restricts the outward movement or reciprocation of the needle 52 and its inner face cooperates with the adjacent surface of the nozzle 48 for the retention therebetween of a compression spring 57. The spring 57 thus tends always to move the needle lineally and outwardly of the cup 47 whereby the conical head 52' is withdrawn from and held in spaced relation to the tapered surface 50 of the nozzle 48. When, on the other hand, the spring 57 is compressed the needle 52 is free to move inwardly of the cup 47 and nozzle 48 and the conical head 52' seats itself flush against the tapered surface 50 of the nozzle 48. If desired or required, an appropriate seal may be employed between the adjacent surfaces of the head 52' and taper 50 following conventional practice.

The wall of the cup 47 is additionally pierced by a hole 58 for the reception and connection of a suitable fitting or nipple 59 by and through which the feed line 40 from the tank 39 is connected. The propellant under pressure from the tank is thereby delivered to the interior of the cup 47, nozzle 48 and, when the needle 52 is unseated from taper 50 under the normal action of the spring 57, the chamber 11.

In order to control the admission of the propellant to the interior of the chamber 11 as above described, a cam 60 is mounted for rotation adjacent the valve 42. This cam 60 is circular with a localized recess or notch 61 in its peripheral edge. When the cam 60 is located with its notch 61 in alignment with the needle 52, the spring 57 is relieved and the conical head 52' of the needle is thereby withdrawn or unseated from the taper 50 for the admission of the propellant to the interior of the chamber 11. However, at all other angular locations of the cam 60 relative to the needle 52, it acts on and against the end of the needle 52 to compress the spring 57 and seat the head 52' against the taper 50 to thereby prevent the passage of the propellant through the orifice 51.

The rate of rotation of the cam 60 is synchronized with the operation of the switch 34 through interconnecting means 38a whereby the notch 61 thereof aligns with the needle 52 only after the capacitors 19 have been fully charged or recharged by the generator 18. Conversely, the rate of rotation of the cam 60 is such that the spring 57 is compressed for closure of the orifice 51 in nozzle 48 by the needle 52 for a period of time corresponding to the time required for the generator 18 to charge the capacitors 19.

In this form of the invention, operation of the generator 18 results in a voltage differential across the terminals of the capacitors 19 and electrodes 12 and 13 when the switch 34 is closed. Due to the space or gap between the electrodes 12 and 13, no current passes across the passage 14 unless some propellant occupies this space to act as a conductor. Nor is arcing possible in the absence of such a conductor, since a vacuum or near vacuum condition in the passage insulates the electrodes 12 and 13. Hence, the propellant or lack of propellant between the electrodes 12 and 13 constitutes, in effect, a closed or opened switch, respectively.

With each injection of propellant into the chamber 11, however, upon operation of the valve 42 as described, it passes into the passage 14 causing the discharge of the capacitors 19 across the electrodes 12 and 13. Thus, the potential difference across the terminals of the capacitors 19 causes an oscillating current across the electrodes 12 and 13 (a flow from the terminals on one side of the capacitors 19 across the electrodes to the terminals on the other side of the capacitors and then the reverse of this flow) until such time as the gases therebetween and within the chamber 11 have diminished to a value below that necessary to conduct a current. When the propellant is thus exhausted a gap or vacuum is reestablished between the electrodes 12 and 13 and the circuit is broken thereby. Thereafter, with the switch 34 closed the generator 18 recharges the capacitors 19. This corresponds to the time interval during which the cam 60 is opposing the normal action of the spring 57 and the valve 42 is closed to prevent the passage of the propellant from its pressurized tank into the chamber 11.

When the cam 60 has completed its revolution and the notch 61 again aligns with the needle 52, the recharging operation has been completed. The valve 42 again opens and the propellant is injected into the chamber 11 for the next cycle of operation wherein the newly admitted propellant is ionized and accelerated by the action of the successive pistons "P," as previously described, through the passage 14. In this way the constant operation of the engine results.

From the foregoing it is apparent that each form of the invention shown in FIG. 3 and FIG. 4 comprises two alternate circuits, viz., a charge circuit between the generator 18 and the capacitors 19 and a discharge circuit between the capacitors 19 and the electrodes 12 and 13. The charge circuit in each case is controlled by the switch 34. In that form of the invention shown in FIG. 3 the discharge circuit is controlled by the switch 37, while in FIG. 4 the discharge circuit is controlled by the valve 42. In each case the switch 34 is connected to, for synchronized operation with, the switch 37 or valve 42 to thereby operate in unison therewith.

In the form of the invention of FIG. 4 which is designed exclusively for operation in space a vacuum or near-vacuum condition exists in the passage 14. Thus, the electrodes 12 and 13 are insulated one from the other until the periodic release of propellant by operation of the valve 42 when the propellant entering the passage serves as a conductor for the conveyance of a current across the electrodes.

In either case, the discharge of current across the electrodes 12 and 13 results in the ionization and acceleration of the propellant in and along the passage 14 out through extension 15. This acceleration results in a reaction directed against the surface 12' whereby forward propulsion is effected. Where the propellant employed is combustible the acceleration thereof through the passage 14 by the action of the electromagnetic piston "P," as above described, causes detonation of the propellant in the passage 14 or extension 15 to augment the thrust.

What is claimed is:

1. An engine comprising a chamber for a propellant under pressure, a passage defined in part by spaced electrodes communicating at one of its ends with the chamber whereby the propellant from the chamber passes into the passage, said passage being arcuate and extending at its other end inwardly of the engine to the transverse center thereof, an extension on said other end of the passage terminating in an exhaust opening disposed concentrically about the center aforesaid, electric generating means, an electrical circuit between said generating means and the electrodes, and means to make and break said circuit whereby current is periodically discharged across the electrodes and the propellant in the passage is thereby ionized and accelerated through the passage and extension and out said opening.

2. An engine comprising a chamber for a propellant under pressure, a pair of spaced generally circular electrodes each curved from its peripheral edge radially inwardly to its center with one of the electrodes provided with a central aperture whereby said electrodes define an annular passage terminating in an exhaust opening, means connecting the peripheral edges of said electrodes to said chamber with said passage in communication with the interior of the chamber to receive the propellant therefrom, a pair of electrical circuits, the first circuit including a generator and a capacitor and the second circuit including said capacitor and the electrodes, and control means operative to periodically make and break said circuits alternately whereby the generator charges the capacitor and the capacitor discharges across said electrodes to ionize and accelerate the propellant in and through the passage and out through the exhaust opening.

3. An engine comprising a chamber for a propellant under pressure, an annual passage directed inwardly of the engine being defined in part by spaced arcuate electrodes concentrically disposed about the transverse center of the engine and in communication at one end with the chamber whereby the propellant from the chamber passes into the passage, an extension from the other end of the passage forming a continuation thereof and opening externally of the engine, a pair of electrical circuits, one including generating means and a capacitor and the other including said capacitor and the electrodes, each circuit including an individual control to open and close it, and means for the concurrent and opposite operation of said controls whereby the capacitor is alternately charged by the generating means and discharged across the electrodes.

4. An engine for operation in substantially a vacuum comprising a passage defined by spaced electrodes radially and concentrically disposed about the transverse center of the engine and opening externally of the engine, delivery means for a propellant under pressure in communication with the passage, a valve operative between said delivery means and the passage, an electrical circuit including electric generating means, capacitor means and the electrodes, said generating means being connected to the capacitor means and the electrodes to impress a voltage differential thereon, and means to periodically open the valve to admit the propellant to the passage whereby said circuit is completed across the electrodes and the propellant in the passage is thereby ionized and accelerated out through the opening aforesaid.

5. An engine comprising a passage defined by spaced, opposed electrodes disposed at an acute angle to the longitudinal centerline of the engine and concentric with the transverse center of the engine, means for the delivery of a propellant under pressure to said passage, a pair of electrical circuits, the first including electrical generating means and a capacitor and the second including said capacitor and the electrodes, a control operatively connected in each said circuit to make and break it, and a connection between said controls for the opposite operation thereof in unison whereby the generating means charges the capacitor and the capacitor is discharged across the electrodes to thereby ionize the propellant in the passage and accelerate it therethrough.

6. An engine comprising a pair of spaced, arcuate electrodes concentrically disposed relative to the transverse center of the engine, the adjacent surfaces of said electrodes forming walls disposed at an acute angle relative to the longitudinal centerline of the engine, an aperture in one of said walls, an annular chamber for a propellant under pressure surrounding said electrodes, conduit means connecting the interior of the chamber to the space between the electrodes, a pair of electrical circuits, one including a generator connected to one terminal of a capacitor and to one of the electrodes and the other including a connection between the other terminal of the capacitor and the other electrode, and means to make and break said circuits in unison and opposition whereby the capacitor is periodically charged by the generator and discharged across the electrodes to ionize the propellant therebetween and accelerate it along said walls and through said aperture to produce thrust on the engine.

7. An engine comprising a pair of spaced, arcuate electrodes concentrically disposed relative to the transverse center of the engine, the adjacent surfaces of said electrodes being disposed at an acute angle relative to the longitudinal centerline of the engine, an annular chamber for a propellant under pressure surrounding said electrodes, conduit means connecting the interior of the chamber to the space between the electrodes, an exhaust exit from the space between the electrodes concentric to the transverse center aforesaid, a pair of electrical circuits, one including a generator connected to one terminal of a capacitor and to one of the electrodes and the other including a connection between the other terminal of the capacitor and the other electrode, switching means in each of said circuits to make and break it, and a control interconnecting said switching means for sequential operation thereof in unison and opposition whereby the capacitor is charged by the generator and discharges across the electrodes to ionize the propellant in the space between the electrodes and accelerate it along said adjacent surface and out the exhaust exit to produce thrust on the engine.

8. An engine comprising a pair of spaced electrodes each arcuately shaped from its peripheral edge radially inwardly to define an annular passage therebetween, one of said electrodes being pierced by a central aperture, a nozzle extension on the pierced electrode at the center thereof in alignment with said aperture, delivery means for the conveyance of a propellant to said passage, and current means operative across said electrodes to ionize and accelerate the propellant through said passage and out said extension.

9. An engine comprising a chamber for a propellant under pressure, a pair of spaced, generally circular electrodes each connected at its peripheral edge to said chamber and curved from its peripheral edge radially inwardly to its center with one of the electrodes provided with a central aperture whereby an arcuate passage is created from the chamber and terminates in an exhaust opening, means establishing communication between the interior of the chamber and the passage whereby said passage forms a continuation of the chamber for propellant flow, a pair of electrical circuits, the first circuit including a generator and a capacitor and the second circuit including said capacitor and the electrodes, and control means operative to periodically make and break said circuits alternately whereby the generator charges the capacitor and the capacitor discharges across said electrodes to ionize and accelerate the propellant in and through the passage and out through the exhaust opening.

10. An engine comprising a chamber for a propellant under pressure, an arcuate passage communicating with said chamber and defined by spaced electrodes having adjacent, curved surfaces disposed radially of the engine, said passage terminating in an exhaust outlet from the engine, and electromagnetic means operative periodically between said electrode surfaces to establish a current across the passage to ionize and accelerate the propellant therein out through the exhaust outlet whereby the reaction to such acceleration acts on and against one of the surfaces to produce forward propulsion.

11. An engine comprising an annular, axially symmetric passage having a substantially constant cross-sectional area throughout its length and terminating at one of its ends in an opening, said passage being defined by a pair of relatively divergent walls disposed radially of and concentric to the axis of the engine, means associated with said passage adjacent its other end for delivering a propellant into said passage, and means to establish a current across the passage whereby the propellant in the passage is ionized and accelerated whereby the reaction forces to such acceleration act on and against one of said walls to produce thrust.

12. An engine comprising an annular passage formed by spaced electrode walls angularly disposed relative to the longitudinal centerline of the engine and terminating in an exhaust opening adjacent the transverse center of the engine, said walls being divergent whereby said passage has a substantially constant cross-sectional area throughout its length, means for delivering a propellant to said passage, and electrical means periodically operative to discharge a current between said electrode walls to accelerate said propellant through the passage and out of said exhaust opening to produce thrust.

13. An engine comprising a pair of aligned, spaced electrodes concentrically located about the transverse center of the engine and curved centrally to define a passage that is annular in planes taken perpendicular to the centerline of the engine and that terminates in an opening at the transverse center aforesaid, delivery means for the conveyance of a propellant to said passage, and electrical means for the discharge of a current across the electrodes whereby the propellant between said electrodes is ionized and accelerated along the passage and out through the opening aforesaid.

14. An engine comprising a pair of spaced, arcuate electrodes defining a passage concentrically disposed relative to the transverse center of the engine, an annular chamber for a propellant under pressure surrounding said passage, conduit means connecting the interior of the chamber to said passage, an exhaust exit from the passage opening at the center of the electrodes, and an electrical circuit including a pulsed current means connected to for discharge across said electrodes whereby the propellant therebetween is periodically ionized and accelerated through said passage and out said exit to produce thrust for propulsion of the engine.

15. An engine comprising a pair of spaced electrodes each arcuately shaped from its peripheral edge radially inwardly to define an annular passage, one of said electrodes being pierced by a central opening concentrically disposed about the transverse center of the engine, delivery means for the conveyance of a propellant to said passage, and current means operative across the electrodes to ionize and accelerate the propellant through the passage and out said opening.

References Cited in the file of this patent

UNITED STATES PATENTS

| 1,363,037 | Goddard | Dec. 21, 1920 |
| 2,526,222 | Goddard | Oct. 17, 1950 |
| 2,731,079 | Smits | Jan. 17, 1956 |
| 2,766,582 | Smith | Oct. 16, 1956 |
| 2,883,580 | Kilpatrick | Apr. 21, 1959 |
| 2,919,370 | Giannini | Dec. 29, 1959 |
| 2,923,852 | Scott | Feb. 2, 1960 |
| 2,929,952 | Giannini | Mar. 22, 1960 |

FOREIGN PATENTS

| 20,697 of 1907 | Great Britain | Sept. 17, 1908 |

OTHER REFERENCES

Publication: Engineering, "The Aeronautical Scene," vol. 186, No. 4831, pages 474, 475.

Moeckel: "Propulsion Methods in Astronautics," pages 1078–1097 of "Advances in Aeronautical Sciences—Proceedings of the First International Congress in the Aeronautical Sciences.

Madrid: September 8–13, 1958, vol. 2, published by Symposium Publications Division, Pergamon Press, New York, pages 1090–1093 relied on.